May 16, 1950     J. H. LESLIE, II     2,508,277
WATER HEATER
Filed Aug. 25, 1945     5 Sheets-Sheet 1
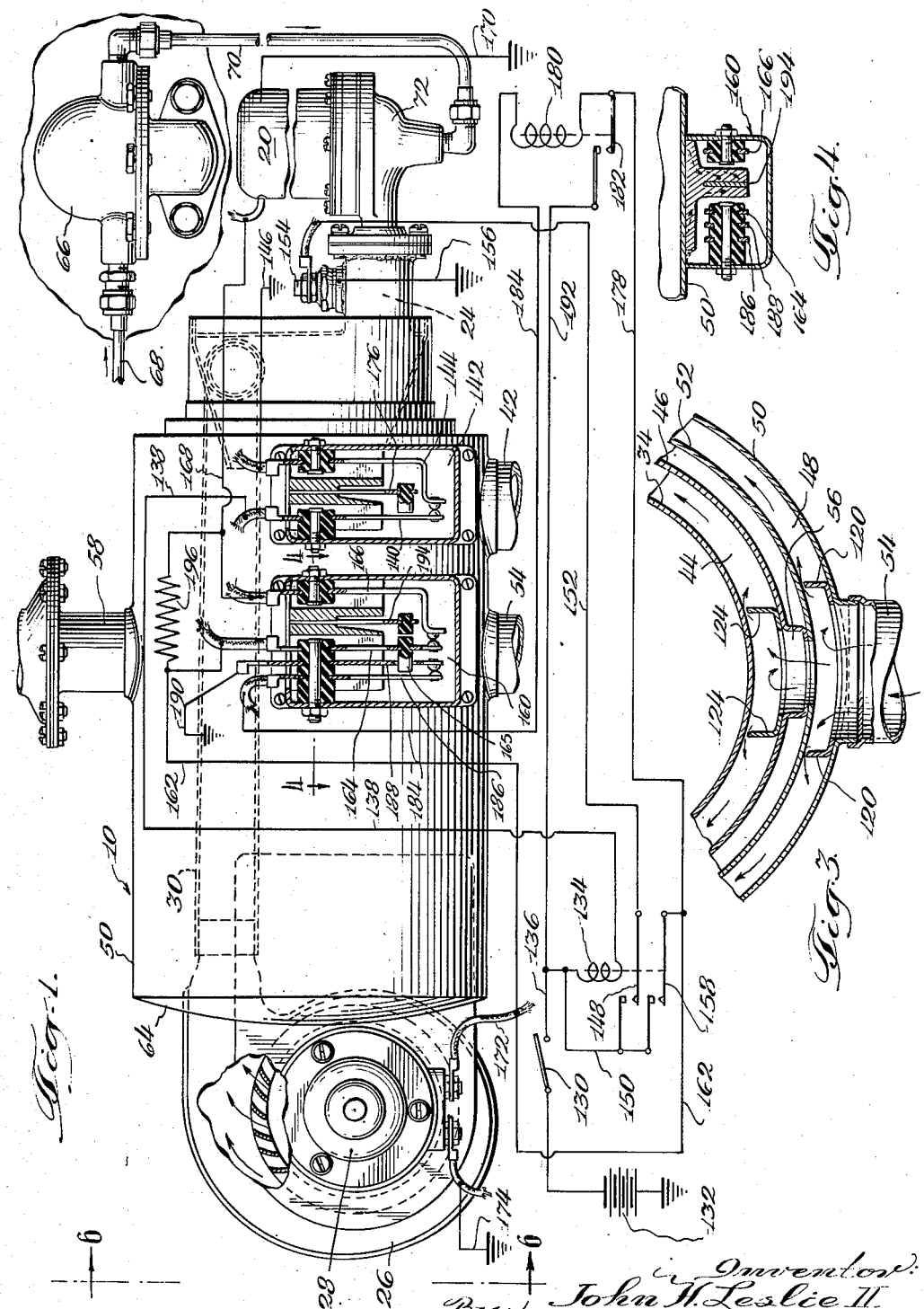

May 16, 1950     J. H. LESLIE, II     2,508,277
WATER HEATER
Filed Aug. 25, 1945     5 Sheets-Sheet 2
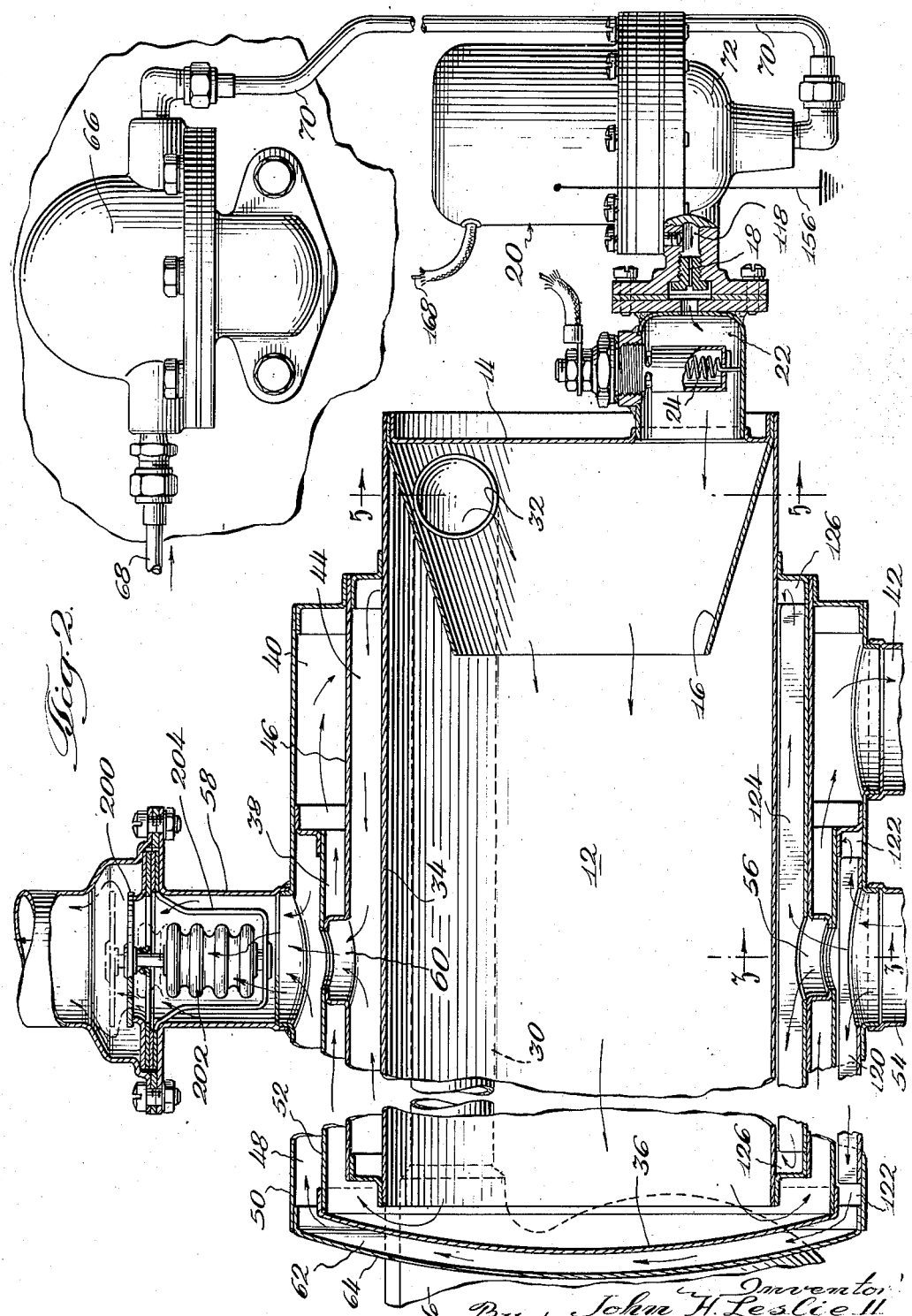

May 16, 1950     J. H. LESLIE, II     2,508,277
WATER HEATER
Filed Aug. 25, 1945     5 Sheets-Sheet 3

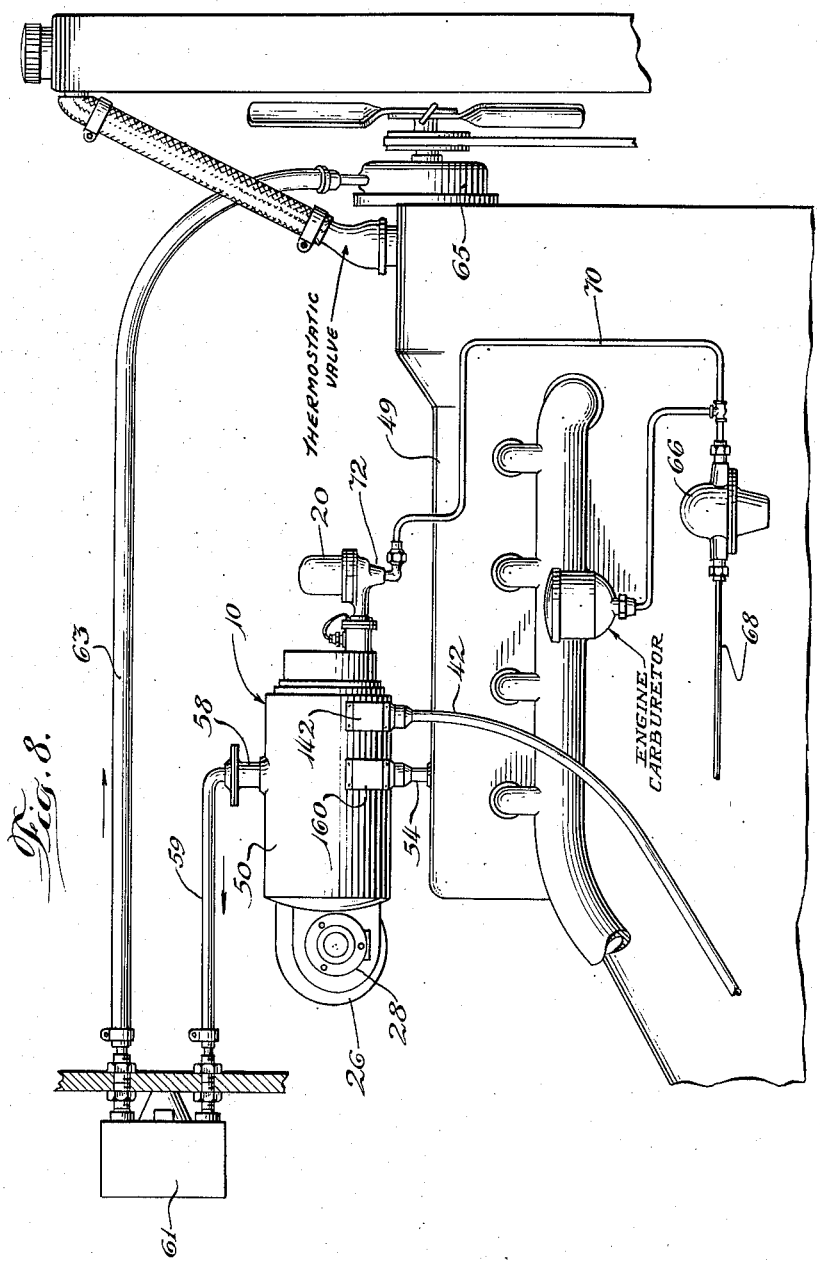

Patented May 16, 1950

2,508,277

UNITED STATES PATENT OFFICE 2,508,277

WATER HEATER

John H. Leslie, II, Winnetka, Ill., assignor to Stewart-Warner Corporation, Chicago, Ill., a corporation of Virginia Application August 25, 1945, Serial No. 612,665

13 Claims. (Cl. 237—8)

This invention relates to heating apparatus and is more particularly concerned with, but not limited to, heating equipment for automobiles and similar vehicles.

In present automotive practice the passenger compartment of a vehicle is frequently heated by means of a hot water radiator connected to the engine cooling system so as to receive a supply of hot water from the water jacket of the internal combustion engine which drives the vehicle. In some installations, only a single heater is used for the entire passenger compartment, while in other installations two or more heaters are employed for this purpose. In some arrangements the hot water radiator is mounted on the dash board which separates the engine compartment from the passenger compartment; in other cases the heating radiator is located beneath the front seat of a passenger automobile. Various other arrangements of hot water heaters are provided for passenger automobiles and in buses several heaters may be located at different points in the passenger space to insure a substantially uniform distribution of the heating effect.

With any of these arrangements the heat radiating unit or units are ineffective until the temperature of the water in the jacket of the engine has been raised by operation of the engine itself. When the vehicle has been standing in the open or in an unheated garage for an appreciable length of time in cold weather, the water in the engine cooling system is at a low temperature and some little time is required to bring the water to a sufficiently high temperature to enable the heat radiating units to function. Most automobile cooling systems include thermostatic controls which prevent the cooling water or most of it from circulating through the automobile cooling radiator until the temperature of the water in the water jacket has reached a predetermined minimum value. The thermostatic control shortens the time required to bring the engine itself to normal operating condition and also the time required to raise the water in the circulatory system to a sufficiently high temperature so that the heat radiating units will begin to give off heat to the passenger compartment. However, even with the best present installations, a very appreciable period of time is required before the heat units commence supplying heat if the automobile and its cooling system are thoroughly chilled at the time the engine is started.

One object of this invention is to provide an auxiliary heating apparatus for use with a circulatory system having one or more heat radiating units and which will materially shorten the time required to bring the water in the system to a sufficiently high temperature to enable the radiating units to give off heat.

Another object of the invention is to provide an auxiliary heating apparatus which can be installed in the circulatory systems of existing automobiles and which is adapted to be used with any type of hot water heating unit.

A further object of the invention is to provide new and improved preheating apparatus for use in connection with the liquid cooling system of an internal combustion engine and which is adapted to raise the temperature of the liquid in the system independently of the heat radiated by the operation of the engine so as to facilitate starting the engine and to improve the efficiency of its operation immediately after starting.

It is also an object of the invention to provide new and improved heating apparatus applicable to the circulatory system of an internal combustion engine, particularly when such a system includes a heat radiating unit or units, and having automatic controlling means serving to start and stop the operation of the auxiliary heater in accordance with temperature requirements of the system.

More specifically, it is an object of the invention to provide new and improved heating apparatus having a burner, a combustion chamber and a water jacket with connections by which said jacket may be included in the circulatory cooling system of an internal combustion engine, together with thermostatic means controlling operation of the burner and located closely adjacent the water inlet of the jacket so as to be responsive to the temperature of the water as it comes from the engine.

Another object of the invention is to provide a heating apparatus adapted to be coupled into the circulatory system of an internal combustion engine when such system includes a heat radiating unit or units, the apparatus being operable independently of the engine so as to supply heat to the radiating unit or units when the engine is not running and being preferably adapted to employ the same fuel as that used in the engine.

Other objects and advantages of the invention will appear from the following description.

In the drawings:

Fig. 1 is a side elevational view partly in section showing a heater embodying this invention and including a diagram of the electrical circuits associated with the control devices therefor;

Fig. 2 is a vertical sectional view of the heater with a portion broken out to condense the view and with the pump and fuel control valve shown in elevation;

Fig. 3 is a detail section taken as indicated at line 3—3 on Fig. 2;

Fig. 4 is a detail section taken as indicated at line 4—4 on Fig. 1;

Fig. 8 is a more or less diagrammatic side elevational view of a portion of a motor vehicle with the heater of the present invention secured in position and connected to a heat radiating unit in the passenger compartment.

Figure 5:
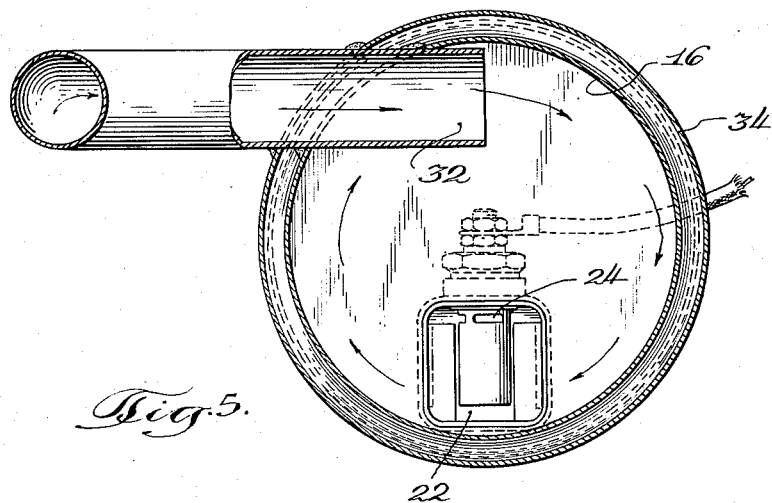
Fig. 5 is a transverse vertical section taken as indicated at line 5—5 on Fig. 2.
Figure 6:
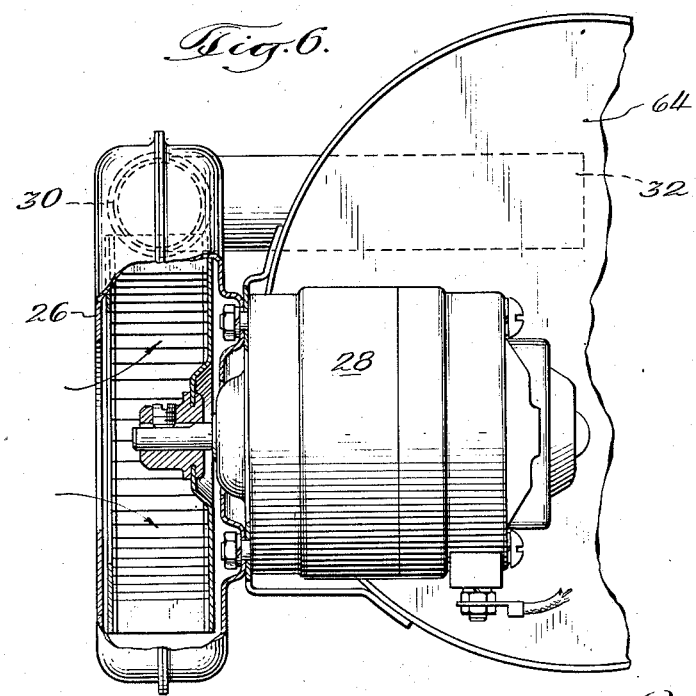
Fig. 6 is a fragmentary end elevation taken as indicated at line 6—6 on Fig. 1, and showing a portion of the lower casing broken away.

As shown in Figs. 1 and 2, the heater which is designated generally by the numeral 10 is of cylindrical form and includes a cylindrical combustion chamber 12 having an end wall 14 and having an initial combustion space or burner defined by a wall 16 of truncated conical form extending from the wall 14 into the end of the cylindrical chamber 12. The liquid fuel for the combustible mixture is supplied through a restricted orifice 18 leading from the fuel control valve device denoted by the numeral 20; the liquid fuel is discharged into a pocket 22 containing an electrically energized igniter 24 of the incandescent type and opening into the burner space within the conical wall 16. Air for the combustible mixture is supplied by a rotary blower 26 driven by a motor 28 and discharging the air into a feed pipe 30 which terminates in a portion 32 extending through the conical wall 16 in a direction substantially tangential thereto. The air entering the burner space within the wall 16 is thus given a whirling motion as indicated by the arrows in Fig. 5 which facilitates thorough intermixture of the air with the liquid fuel. The mixture is ignited initially by contact with the incandescent element 24 and the flame proceeds through the combustion chamber 12 from the burner space toward the opposite end of the chamber. The cylindrical wall 34 of the chamber 12 terminates in spaced relation to the end wall 36 so that the combustion space 12 communicates with an annular space 38 surrounding it and leading to the annular channel 40 and the exhaust passage 42 extending therefrom.

The water jacket for the water which is to be heated by the products of combustion is in two parts; the inner jacket 44 is defined by the cylindrical wall 34 of the combustion chamber and a cylindrical wall 46 spaced from it as seen in Fig. 2. The outer jacket 48 is contained between the outer cylindrical wall 50 of the heater and an inner cylindrical wall 52 spaced therefrom and from the wall 46. The combustion space 38 is thus disposed between the walls 46 and 52 so that products of combustion are in heat exchange relation with both walls of the jacket 44 and with the inner wall 52 of the jacket 48. An inlet pipe 54 extends from the circulatory system of the vehicle engine 49 (Fig. 8) into connection with the outer jacket 48 as seen in Fig. 2 and in alignment with this inlet pipe 54 there is secured a connecting thimble 56 providing communication with the inner jacket 44 so that the in-flowing water divides between the two jackets and passes upwardly around both sides of the combustion chamber 12. The water outlet 58 is shown extending from the upper side of the heater casing 50 and in communication with the outer jacket 48. A thimble 60 is arranged in alignment with the outlet 58 for interconnecting the inner jacket 44 and the outer jacket 48 and providing a direct outlet from the inner jacket. The outer jacket 48 includes a space 62 at the end of the combustion chamber 12 between the end wall 36 thereof and the end wall 64 of the heater. At its upper end the outlet 58 is connected by a pipe 59 (Fig. 8) to the inlet end of one or more heat radiating units 61 which may be of conventional construction and are located in the passenger compartment of the vehicle. The outlet end of the heat radiating unit 61 is connected by a pipe 63 to a part of the engine circulatory system such as the water pump 65.

The liquid fuel for the heater is conveniently supplied by an engine driven pump 66 which is shown with a fuel supply pipe 68 leading into it and a fuel feed pipe 70 leading from the pump into the fuel bowl 72 of the control valve device 20. This valve device is shown in detail in Fig. 7 and includes an inlet valve 74 which is upheld by a spring 76 and is normally urged by the fuel pump pressure toward a valve seat 78 formed in the fitting 80 which is screwed into the inlet passage 82 with which the feed pipe 70 is connected. The fitting 80 is provided with an outlet port 84 through which the liquid fuel is delivered to the bowl 72 when the valve 74 is opened. The pump 66 may be of the type designed to maintain a constant pressure of liquid fuel in the feed pipe 70; but if the fuel supply pressure is variable the valve device 20 acts as a pressure regulator to insure that fuel is fed therefrom to the burner at a definite pressure for any given setting of the electro-magnetic valve control means, as more fully explained in the co-pending application Serial No. 577,234, filed February 10, 1945, and assigned to the assignee of this application.

Figure 7:
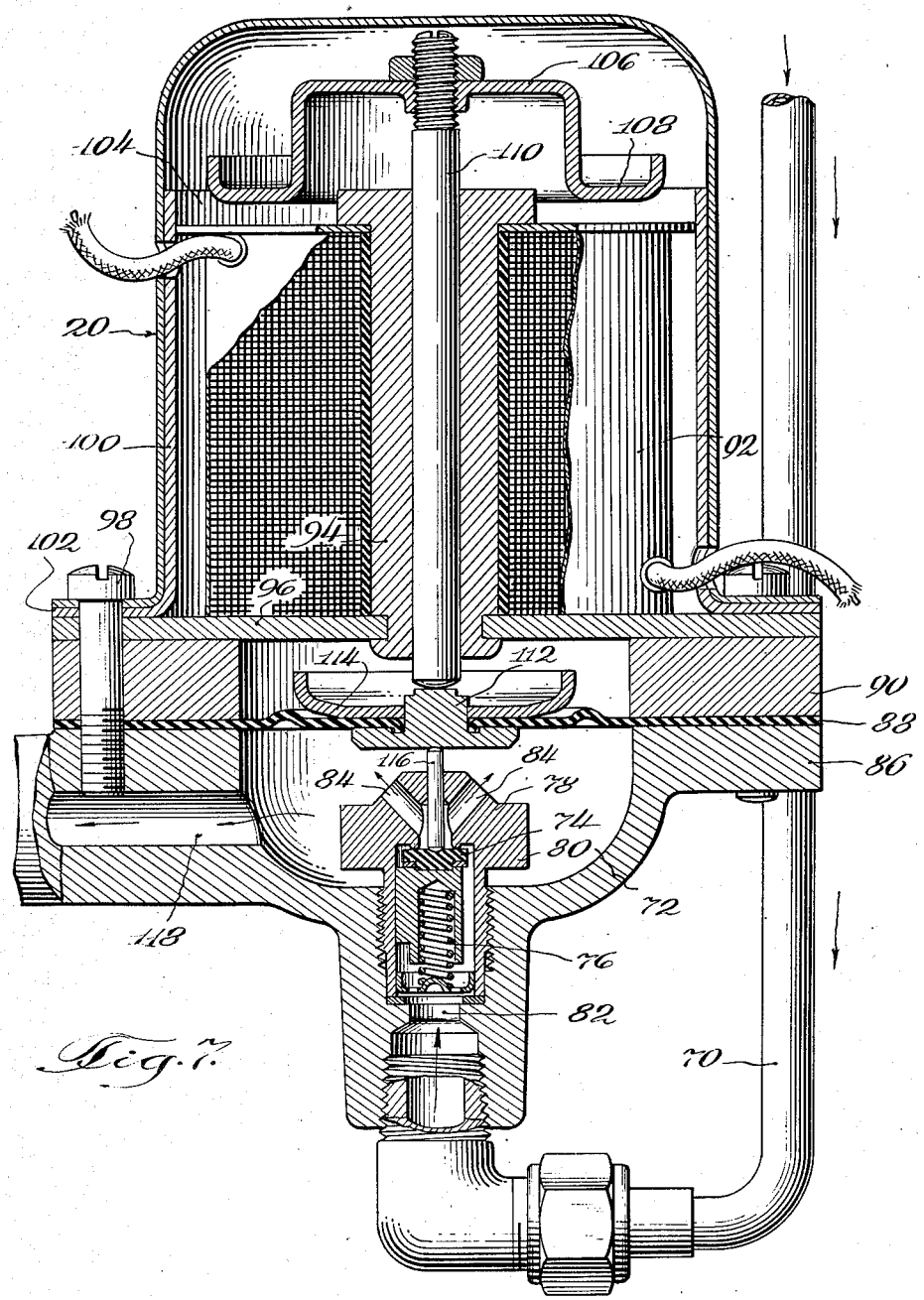
Fig. 7 is an axial vertical section of the electrically-operated fuel control valve for the heater.

The fuel bowl 72 is formed with a flange 86 and an upper wall is provided for the bowl in the form of a flexible diaphragm 88 having its peripheral portion clamped between the flange 86 and a ring 90 as shown in Fig. 7. An electromagnet surmounts the ring 90 and comprises a coil 92 fitted on to a magnetic core 94 which is secured at its lower end in a magnetic plate 96. Clamping screws 98 extend through the marginal portions of the plate 96 and through the ring 90 and flange 86 for clamping the diaphragm 88 in position and mounting the electromagnet thereover. A cylindrical shell 100 of magnetic material surrounds the coil 92 and includes a foot flange 102 which is secured under the heads of the screws 98 so that in effect the upper end of the core 94 forms one pole of the magnet while the annular upper end of the shell 100 forms the opposite pole with an annular air gap between them at 104. An armature member 106 in the form of an inverted cup is arranged with its marginal portion 108 adjacent the air gap 104 and with a brass stem 110 extending slidably through the core 94; thus when the magnet coil 92 is energized, the armature 106 and its stem 110 are drawn downwardly. The lower end of the stem 110 engages a contact button 112 which is clamped in the center of the diaphragm 88, said button having a head engaging the lower face of the diaphragm and having a cupped washer 114 engaging the upper face of the diaphragm, the shank portion of the button 112 being upset to hold the washer 114 rigidly in clamping relation to the diaphragm. A short rod or stem 116 is slidably guided in the upper end of the fitting 80 and extends between the lower face of the button 112 and the upper face of the valve member 74 so that when the armature stem 110 is drawn downwardly its movement is transmitted through the rod 116 to the valve 74 to unseat the latter and permit flow of liquid fuel from the feed pipe 70 through the bowl 72 and through its outlet passage 118 which leads to the restricted orifice 18 through which the fuel is discharged to the burner.

The water inlet pipe 54 leads from the upper portion of the water jacket of the internal combustion engine (Fig. 8), and preferably, in order to distribute the incoming water in the jacket 44, baffle rails 120 are secured to the inner face of the wall 50 and extend parallel to each other at opposite sides of the inlet 54 almost throughout the entire length of the jacket 48. The upper edges of the rails 120 stop short of the opposite wall 52 so that the incoming water can spill over the baffles into the space 48 at both sides of the inlet; and said rails 120 also stop short of the ends of the jacket 48 providing passages 122 as seen in Fig. 2 by which the remainder of the water will find its way into the main portion of the jacket 48. Similarly, baffle rails 124 are arranged at opposite sides of the inlet thimble 56 in the jacket 44 and these rails extend almost throughout the length of the jacket 44. Their upper edges stop short of the inner wall 34 providing narrow spaces through which the water can spill over into the jacket 44 at both sides of the inlet while passages 126 are formed at the ends of the baffles 124 to admit the remainder of the water to the main portion of the jacket space 44. By this arrangement the colder water entering through the inlet 54 is quickly spread over a considerable area of the heating surface and is well distributed into the body of warmer water already in the jackets to facilitate the rapid transfer of heat to the incoming water.

To place the heater in service the main switch 130 is closed for connecting the various control devices with a source of electrical energy such as the battery 132 indicated in Fig. 1. This energizes the relay coil 134. The circuit for the relay 134 includes the conductor 136, conductor 138, contact arm 140 of a thermostat 142, and contact arm 144 which is shown grounded at 146, the battery 132 also having one terminal grounded. The relay 134 closes the switch 148 providing a circuit including conductor 150 and conductor 152 leading to the terminal 154 of the igniter 24, the other terminal of the igniter being grounded as indicated at 156.

At the same time the relay 134 closes the switch 158 which provides connections for the high-low heat thermostat switch 160. From the switch 158 a lead wire 162 extends to the switch arm 164 which engages switch arm 166 from which the conductor 168 leads to the coil 92 of the magnetic fuel control device 20, the other side of the coil being grounded as indicated at 170. It may be understood that when the heater is cold all thermostatic contacts are closed so that closing of the main switch 130 thus energizes the igniter 24 and causes the magnetic control device 20 to open the fuel valve 74 and admit fuel to the burner space within the wall 16. The switch 158 also provides a connection by way of conductors 162 and 172 leading to the blower motor 28, the other terminal of the motor being grounded at 174 so that the blower is immediately actuated to furnish air for admixture with the liquid fuel in the combustion space of the heater.

The igniter thermostat 142 is attached to the outer wall 50 of the heater directly over the annular passage 40 which leads to the exhaust pipe 42. At this point there is no water jacket interposed between the outer wall 50 and the exhaust passage; accordingly, the thermostat 142 will be promptly influenced by the temperature of the exhaust and when this reaches about 100° F. the bimetallic arm 176 will be flexed sufficiently to force the contact blade 140 away from the blade 144 and open the circuit through this thermostat. This will de-energize the relay coil 134, thus opening the switch 148 which is in the circuit of the igniter 24. Combustion having been initiated and continued up to the point at which a temperature of 100° F. is available to actuate the thermostat 142, it may be assumed that combustion will maintain itself without the aid of electrical ignition.

When the switch 148 is opened by de-energizing of the relay 134, the switch 158 is also opened, thus breaking the original circuits by which the blower motor 28 and the fuel control valve 20 were energized. However, the conductor 178 which extends from the switch 158 to a holding relay 180 energizes this relay and closes its switch 182 when the main switch 130 is initially closed; the circuit for the relay proceeds from conductor 178 through the relay coil 180 thence by way of conductor 184 to the terminal of the blade 186 of the high-low heat thermostat 160, and this blade 186 is normally in contact with the blade 188 which is grounded as indicated at 190. The closing of the switch 182 by relay 180 provides a direct feed wire 192 for the relay coil 180, as a path independent of the relay 134, so that the coil 180 and its switch 182 comprise a holding relay for maintaining an energizing circuit for the blower motor 28 through conductors 178, 162, and 172, and for the magnetic fuel control device 20 by way of conductors 178, 162 and the contacts of the high-low heat thermostat 160.

The thermostat 160 is mounted on the side wall 50 of the heater at a position relatively close to the water inlet 54 at which the water flowing from the engine jacket enters the heater. This thermostat thus serves to control the operation of the heater in accordance with the requirements as indicated by the temperature of the water in the upper portion of the engine jacket from which the water is taken directly into the heater. If the temperature of that water is relatively low it is evident that the operation of the heater as a booster is required to elevate the temperature of the water to a point at which efficient operation of the engine can take place and at which it will carry sufficient heat for warming the passenger compartment if that is included in the circulatory system. If the temperature of the water in the engine is relatively high, it is obvious that there is no need of increasing its temperature by operation of the heater and it can be allowed to flow through the heater without having any heat added to it.

To accomplish these results, the bimetallic arm 194 of the thermostat 160 is designed to swing to the left as seen in Fig. 1 and to move the contact arm 164 out of engagement with the contact arm 166 when the temperature of the heater jacket at this point reaches about 120° F. This opens the direct circuit through the contacts 164 and 166 and requires the current to flow entirely by way of the resistance 196 which is shunted across the terminals of said contacts 164 and 166 as seen in Fig. 1. This reduces the current strength available in the coil 92 of the magnetic fuel control device 26, permitting the fuel valve 74 to be partially closed by the pressure of the fuel supply and reducing the flow of fuel to the burner so that the latter operates at only partial capacity and the transfer of heat to the water in the heater jackets 44 and 48 is retarded. However, if the temperature of the water continues to rise until it reaches about 160° F. the continued flexure of the bimetallic arm 194 carrying with it the contact arm 164 and its block 165 of insulating material will bring said part 165 into engagement with the contact arm 186 and force the latter out of engagement with its cooperating contact 188, thus opening the circuit through conductor 184 and holding relay 180 with the result that the motor 28 and the magnetic fuel control device 26 are completely de-energized, shutting off the supply of fuel and air and terminating combustion in the chamber 12 for the time being. When the relay switch 182 is opened, the operation of the heater will not be resumed upon the mere closing of the high heat contacts 186 and 188 of the thermostat 160 or upon closing of the low heat contacts 164 and 166, such closure resulting from the gradual cooling of the water in the adjacent jacket 48. The relay coil 180 can be initially energized only by way of the switch 158 which is controlled by relay 134, but as soon as the temperature drops sufficiently to permit closure of the igniter thermostat 142, the relay 134 will be re-energized, closing the switches 148 and 158 and causing the other circuits to be completed as already described in connection with the initial operation of the heater. The heater will thus continue to operate at intervals to maintain the water at a safe temperature to insure satisfactory operation of the engine and also satisfactory radiation from the circulatory system whenever it is employed for heating the passenger compartment of the vehicle.

The circulation of the water through the heater and through the engine cooling system is further controlled by means of a flow regulating valve 200 which is mounted at the end of the outlet connection 58 with the governing bellows 202 of the "Sylphon" type which may be understood as comprising a sealed elastic chamber which expands as the increase of temperature causes an increase in the vapor pressure of the liquid sealed therein. The "Sylphon" is carried on a bracket 204 which supports it within the outlet passage 58 where it is exposed to the temperature of the water flowing from the heater so that as the temperature increases the valve 200 will be opened more widely to permit of more rapid circulation of the water through the circulatory system, and as the water temperature decreases the valve will be drawn toward its seat for restricting the flow, thus allowing the water to remain in the jackets 44 and 48 for a longer period so that it may absorb more heat before passing into the system. It will be understood that this regulating valve 200 is responsive to variations of water temperature caused by the operation of the engine and its regular cooling system and that so long as the engine itself maintains the water at a predetermined temperature the boosting action of the heater will not be required and the heater will not operate, although it will remain as an element of the circulatory system.

It will be understood that the complete circulatory system comprises the heater, the engine jacket, the engine radiator, and ordinary heat radiating units in the passenger compartment of the vehicle. A thermostatic valve (Fig. 8) similar to the valve 200 is conventionally arranged in the connection between the engine and its radiator so as to close this connection when the water is cold and open it to apply the cooling effect of the radiator as the engine raises the water temperature. But the thermostatic valve 200 will be set to open at a lower temperature than the engine radiator thermostat so that flow through the heating system of the vehicle can be maintained after the engine is warmed up. Generally, the engine water temperature will not rise much above the setting of the engine radiator thermostat since at that point the cooling effect of the radiator will be applied to reduce the water temperature. But with the thermostatic valve 200 arranged to open at a lower temperature than the engine radiator thermostat the water will circulate through the heating system of the vehicle and, except in extreme weather, the vehicle may be heated mainly from the engine without requiring the boosting effect of the heater for any considerable time. In warm weather, when heat is not wanted in the passenger compartment, a suitable manual control valve (not shown) in the water connection to the radiating units can be closed and the engine radiator then will be relied upon to dissipate excess heat generated by the engine.

While there is shown and described herein certain structure illustrating the invention, it is to be understood that the invention is not limited thereto, or thereby but may assume numerous other forms and includes all modifications, variations and equivalents coming with the scope of the following claims.

I claim:

1. A heating unit for use in combination with the circulatory cooling system of an internal combustion engine and heat-radiating means connected thereto, said unit comprising an internal combustion heater including a combustion chamber having an exhaust passage for the products of combustion, a water jacket in heat exchange relation with the combustion chamber and having inlet and outlet passages connected with said circulatory system, a heat responsive device disposed adjacent the water jacket inlet so as to respond to the temperature of the water entering said jacket, said device having an element movable to different positions corresponding to different temperatures, a fuel inlet valve for the heater, electromagnetic actuating means for said valve, a source of electrical energy connected in circuit with said actuating means, a first switch operated by said element at one temperature to effect a reduction in the current flow to said electromagnetic means for reducing the opening of said fuel inlet valve, and a second switch operable at a second temperature by further movement of said element further to reduce current to said electromagnetic means and further to reduce the opening of said fuel inlet valve.

2. A heating unit for use in combination with the circulatory cooling system of an internal combustion engine and heat-radiating means connected thereto, said unit comprising an internal combustion heater including a combustion chamber having an exhaust passage for the products of combustion, a water jacket in heat exchange relation with the combustion chamber and having inlet and outlet passages connected with said circulatory system, a heat responsive device disposed adjacent the water jacket inlet so as to respond to the temperature of the water entering the jacket, said device having an element movable to different positions corresponding to different temperatures, a fuel inlet valve for the heater, electromagnetic actuating means for said valve, a source of electrical energy, a plurality of circuits differing in resistance for energizing said electromagnetic means and thereby varying the opening of said fuel inlet valve including a circuit to effect maximum opening of said valve, a first switch in said last mentioned circuit operated by said element in response to variations in the water inlet temperature relative to one level to open and close said circuit, and a second switch in another circuit operable by movement of said element in response to variations in water inlet temperature relative to another temperature level further to vary the current to said electromagnetic means and the consequent opening of said valve.

3. A heating unit for use in combination with the circulatory cooling system of an internal combustion engine and heat-radiating means connected thereto, said unit comprising an internal combustion heater including a combustion chamber having an exhaust passage for the products of combustion, a water jacket in heat exchange relation with the combustion chamber and having inlet and outlet passages connected with said circulatory system, a heat responsive device disposed adjacent the water jacket inlet so as to respond to the temperature of the water entering said jacket, a fuel inlet valve for the heater, and actuating means for said valve controlled by said heat responsive device, together with a valve in the outlet of the water jacket and heat responsive means in said outlet connected to open said valve gradually as the temperature of the water at said outlet rises.

4. A heating unit for use in combination with the circulatory system of an internal combustion engine and heat-radiating means connected to said system, said unit comprising an internal combustion heater including a combustion chamber having an exhaust passage for the products of combustion, a water jacket in heat exchange relation with the combustion chamber and having inlet and outlet passages connected with said circulatory system, an electrically energized igniting device for the heater, a fuel inlet valve for said heater, an electromagnetic control device for said valve, a source of electrical energy for said devices, a thermostat mounted adjacent the exhaust passage and adjusted to open at a predetermined temperature, a relay coil in series with said thermostat, a relay switch closed by said coil to complete the igniter circuit, a second relay switch closed by said coil to complete a circuit for the fuel control device, a holding relay actuated by said second switch to maintain a circuit for the fuel control device after said thermostat opens, and a second thermostat responsive to the water temperature and adjusted to open the holding circuit at a predetermined temperature higher than that at which the first thermostat opens.

5. In a heating unit as defined in claim 4, said second thermostat being mounted on the water jacket adjacent the inlet passage leading from the engine circulatory system.

6. A heating unit for use in combination with the circulatory system of an internal combustion engine and heat-radiating means connected to said system, said unit comprising an internal combustion heater including a combustion chamber having an exhaust passage for the products of combustion, a water jacket in heat exchange relation with the combustion chamber and having inlet and outlet passages connected with said circulatory system, an electrically energized igniting device for the heater, a fuel inlet valve for said heater, an electromagnetic control device for said valve, a source of electrical energy for said devices, a thermostat mounted adjacent the exhaust passage and adjusted to open at a predetermined temperature, said thermostat controlling a circuit for the igniting device, a thermostat responsive to the water temperature and adjusted to open a circuit for the fuel control device at a predtermined temperature higher than that at which the first thermostat opens, the second thermostat closing before the first as the heater cools, and means preventing re-energizing of the fuel control device until the igniter is re-energized.

7. A heating unit for use in combination with the circulatory system of an internal combustion engine and heat-radiating means connected to said system, said unit comprising an internal combustion heater including a combustion chamber having an exhaust passage for the products of combustion, a water jacket in heat exchange relation with the combustion chamber and having inlet and outlet passages connected with said circulatory system, an electrically energized igniting device for the heater, a fuel inlet valve for said heater, an electromagnetic control device for said valve, a source of electrical energy for said devices, said fuel control device including a solenoid which opens the valve in accordance with the strength of the current applied to said solenoid, a resistance in the solenoid circuit, and a thermostatic switch mounted adjacent the water inlet passage for response to the temperature of the water entering the jacket, said switch being normally closed and being connected in shunt with the resistance but adjusted to open at a predetermined temperature to cut the resistance into the solenoid circuit causing partial closing of the fuel inlet valve.

8. A heating unit for use in combination with the circulatory system of an internal combustion engine and heat-radiating means connected to said system, said unit comprising an internal combustion heater including a combustion chamber having an exhaust passage for the products of combustion, a water jacket in heat exchange relation with the combustion chamber and having inlet and outlet passages connected with said circulatory system, an electrically energized igniting device for the heater, a fuel inlet valve for said heater, an electromagnetic control device for said valve, a source of electrical energy for said devices, said fuel control device including a solenoid which opens the valve in opposition to the fuel supply pressure and in accordance with the strength of the current applied to said solenoid, a resistance in the solenoid circuit, and a thermostatic switch mounted adjacent the water inlet passage for response to the temperature of the water entering the jacket, said switch being normally closed and being connected in shunt with the resistance but adjusted to open at a predetermined temperature to cut the resistance into the solenoid circuit causing partial closing of the fuel inlet valve, together with a second thermostatic switch mounted adjacent the water inlet passage and normally closed but adapted to open the solenoid circuit for closing the fuel inlet valve at a predetermined higher temperature.

9. A heating unit for use in combination with the circulatory system of an internal combustion engine and heat-radiating means connected to said system, said unit comprising an internal combustion heater including a combustion chamber having an exhaust passage for the products of combustion, a water jacket in heat exchange relation with the combustion chamber and having inlet and outlet passages connected with said circulatory system, an electrically energized igniting device for the heater, a fuel inlet valve for said heater, an electromagnetic control device for said valve, a source of electrical energy for said devices, said fuel control device including a solenoid which opens the valve in accordance with the strength of the current applied to said solenoid, and a thermostatic device mounted adjacent the water inlet passage for response to the temperature of the water entering the jacket and operable to reduce the current applied to the solenoid as the temperature of the water increases.

10. A heating unit for use in combination with the circulatory system of an internal combustion engine and heat-radiating means connected to said system, said unit comprising an internal combustion heater including a combustion chamber having an exhaust passage for the products of combustion, a water jacket in heat exchange relation with the combustion chamber and having inlet and outlet passages connected with said circulatory system, said combustion chamber being cylindrical and said water jacket extending around it, the water inlet passage entering the jacket at one side, and baffles at opposite sides of the inlet within the jacket extending nearly across it to the wall of the combustion chamber and extending longitudinally in the jacket through a substantial portion of its length to distribute the water as it flows from the inlet.

11. A heating system for use in combination with the circulatory system of an internal combustion engine which includes the engine water jacket and cooling radiator with a thermally responsive valve controlling the circulation through said radiator, said heating system including an internal combustion heater having a combustion chamber, a water jacket in heat exchange relation therewith, inlet means connecting said water jacket with the engine jacket, a heat radiating unit, an outlet passage connecting said water jacket of the water with said unit, and heat responsive valve means in said outlet passage adjusted to open at a lower temperature than the said thermally responsive valve which controls circulation through the engine radiator.

12. A heating unit as defined in claim 8 wherein means is provided to prevent reopening of the fuel valve until both thermostatic switches are closed.

13. In a heating unit as defined in claim 4 an electrically driven blower connected to furnish combustion air to the heater and a circuit for said blower in parallel with the fuel control device whereby the blower is started when the fuel inlet valve is opened and stopped when said valve is closed.

JOHN H. LESLIE, II.

REFERENCES CITED

The following references are of record in the file of this patent:

UNITED STATES PATENTS

| Number | Name | Date |
|---|---|---|
| 989,881 | Shoemaker | Apr. 18, 1911 |
| 1,180,638 | Fabian | Apr. 25, 1916 |
| 2,012,068 | McGoldrick | Aug. 20, 1935 |
| 2,140,473 | Grant | Dec. 13, 1938 |
| 2,219,104 | Johnson | Oct. 22, 1940 |
| 2,270,824 | Meyerhofer | Jan. 20, 1942 |
| 2,300,010 | Rose | Oct. 27, 1942 |
| 2,300,011 | Rose | Oct. 27, 1942 |